United States Patent
Karri et al.

(10) Patent No.: US 11,789,844 B2
(45) Date of Patent: Oct. 17, 2023

(54) CONTAINER DEPLOYMENT WITH VISUAL SECURITY PROFILE

(71) Applicant: International Business Machines Corporation, Armonk, NY (US)

(72) Inventors: Venkata Vara Prasad Karri, Visakhapatnam (IN); Sarbajit K. Rakshit, Kolkata (IN); Akash U. Dhoot, Pune (IN); Nitika Sharma, Punjab (IN)

(73) Assignee: International Business Machines Corporation, Armonk, NY (US)

( * ) Notice: Subject to any disclaimer, the term of this patent is extended or adjusted under 35 U.S.C. 154(b) by 84 days.

(21) Appl. No.: 17/451,824

(22) Filed: Oct. 22, 2021

(65) Prior Publication Data

US 2023/0125755 A1    Apr. 27, 2023

(51) Int. Cl.
*G06F 11/32* (2006.01)
*G06F 21/57* (2013.01)
*G06F 9/455* (2018.01)
*G06F 11/34* (2006.01)

(52) U.S. Cl.
CPC ........ *G06F 11/321* (2013.01); *G06F 9/45558* (2013.01); *G06F 11/3457* (2013.01); *G06F 21/577* (2013.01); *G06F 2009/4557* (2013.01); *G06F 2009/45587* (2013.01)

(58) Field of Classification Search
CPC .............. G06F 11/321; G06F 9/45558; G06F 11/3457; G06F 21/577; G06F 2009/4557; G06F 2009/45587

USPC .......................................................... 714/46
See application file for complete search history.

(56) References Cited

U.S. PATENT DOCUMENTS

| 2014/0280961 | A1 | 9/2014 | Martinez |
| 2017/0116415 | A1* | 4/2017 | Stopel ..................... G06F 21/52 |
| 2017/0310472 | A1* | 10/2017 | Garcia-Morchon .... H04L 9/083 |
| 2019/0319926 | A1 | 10/2019 | Cummins |

OTHER PUBLICATIONS

"Aqua Security Announces $9 Million in Series A Funding, Led by Microsoft", Tel Aviv, Israel—Sep. 27, 2016, 5 pages, <https://www.aquasec.com/news/aqua-security-announces-9m-series-funding-led-microsoft/>.
"Azure security baseline for Container Instances", Feb. 17, 2021, 33 pages, <https://docs.microsoft.com/en-us/azure/container-instances/security-baseline>.
"NeuVector Announces Container Visualization, Encryption, and Security Solution for NGINX Plus", Neuvector, San Jose, California, Mar. 8, 2017, 6 pages, <https://blog.neuvector.com/article/neuvector-announces-security-solution-for-nginx-plus>.

(Continued)

*Primary Examiner* — Yair Leibovich
(74) *Attorney, Agent, or Firm* — Stephen R. Yoder (57) ABSTRACT

A method and a corresponding system that enables developers to determine a combination of two or more security profiles in which to deploy and configure a container (or set of containers). In some instances, the determination of which two or more security profiles in which to deploy the container (or set of containers) is made based upon the use of a two-dimensional (2D) diagram or a three-dimensional (3D) diagram that provides a visual display of at least one overlap between the two or more security profiles represented therein.

18 Claims, 3 Drawing Sheets

(56) References Cited

OTHER PUBLICATIONS

"What are security profiles? | Linux Security | 11.10 | F-Secure User Guides", © F-Secure 2020, 3 pages, <https://help.f-secure.com/product.html?business/linux-security/11.10/en/concept_DF882D0BD7A346C9927B7CE5129FF2A4-11.10-en>.
Harel, Tammar, "Visualize and Prioritize Risks in Kubernetes with Aqua Risk Explorer", Jun. 11, 2020, Aqua Blog, 11 pages, <https://blog.aquasec.com/kubernetes-security-risk-explorer>.

* cited by examiner

CONTAINER DEPLOYMENT WITH VISUAL SECURITY PROFILE

BACKGROUND

The present invention generally relates to the field of virtualized container usage, and more specifically to the use of virtualized containers in the context of maintaining enterprise-level security and/or processing enterprise-level security related data.

SUMMARY

According to an aspect of the present invention, there is a method, computer program product and/or system that performs the following operations (not necessarily in the following order): (i) receiving, from a security profile library and to a visualization engine, a plurality of security profiles, with each security profile of the plurality of security profiles being represented as a three-dimensional (3D) visual diagram; (ii) determining a set of spatial intersections amongst the plurality of security profiles; (iii) deploying a plurality of containers in the set of spatial intersections, with at least one container of the plurality of containers being deployed in at least one of the spatial intersections; and (iv) responsive to the deployment of the plurality of containers in the set of spatial intersections, configuring the at least one container being deployed with the security profiles corresponding to the at least one spatial intersection.

DETAILED DESCRIPTION

Some embodiments of the present invention are directed towards a method and a corresponding system that enables developers to determine a combination of two or more security profiles in which to deploy and configure a container (or set of containers). In some instances, the determination of which two or more security profiles in which to deploy the container (or set of containers) is made based upon the use of a two-dimensional (2D) diagram or a three-dimensional (3D) diagram that provides a visual display of at least one overlap between the two or more security profiles represented therein.

This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
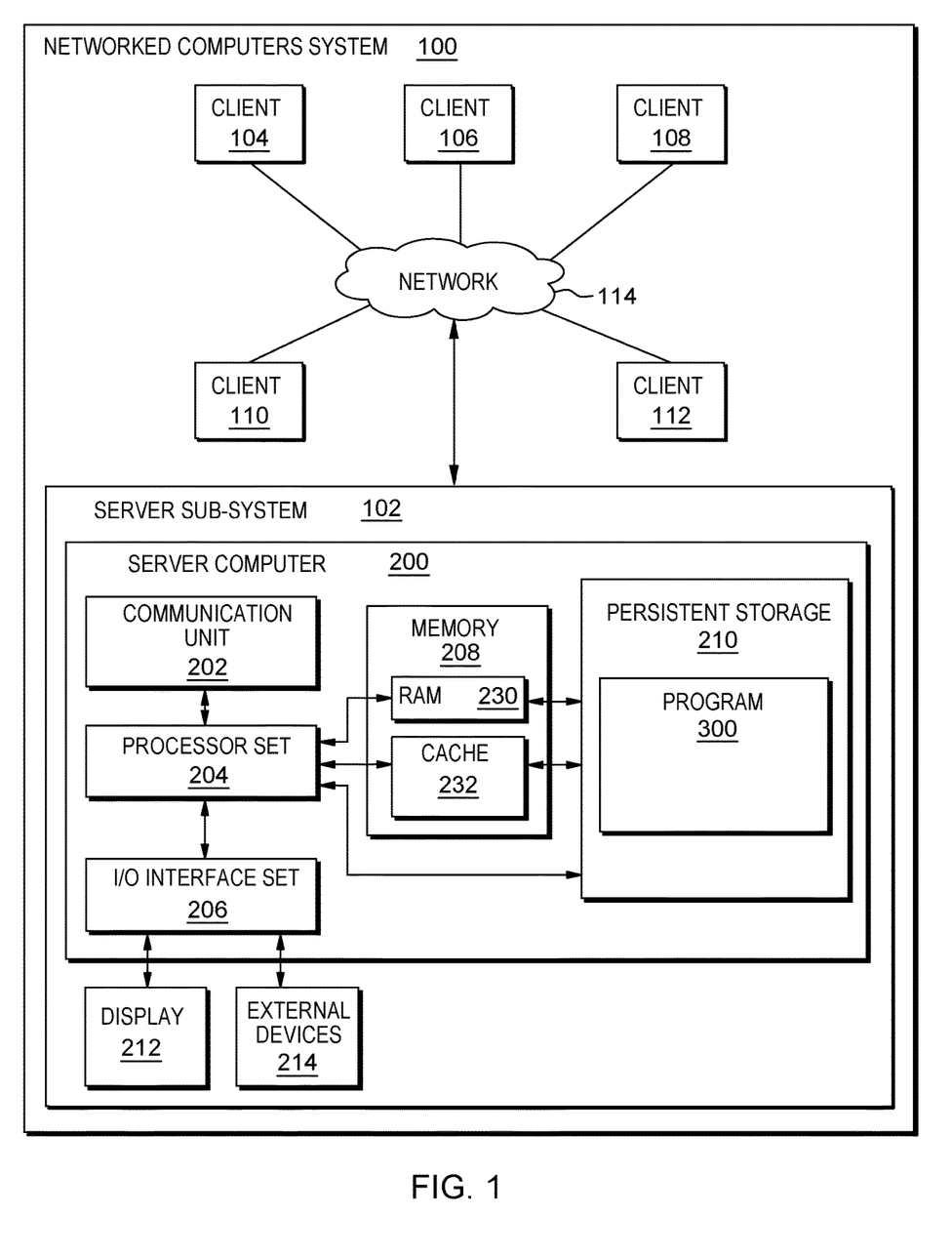
FIG. 1 is a block diagram view of a first embodiment of a system according to the present invention.

An embodiment of a possible hardware and software environment for software and/or methods according to the present invention will now be described in detail with reference to the Figures. FIG. 1 is a functional block diagram illustrating various portions of networked computers system 100, including: server sub-system 102; client sub-systems 104, 106, 108, 110, 112; communication network 114; server computer 200; communication unit 202; processor set 204; input/output (I/O) interface set 206; memory device 208; persistent storage device 210; display device 212; external device set 214; random access memory (RAM) devices 230; cache memory device 232; and program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
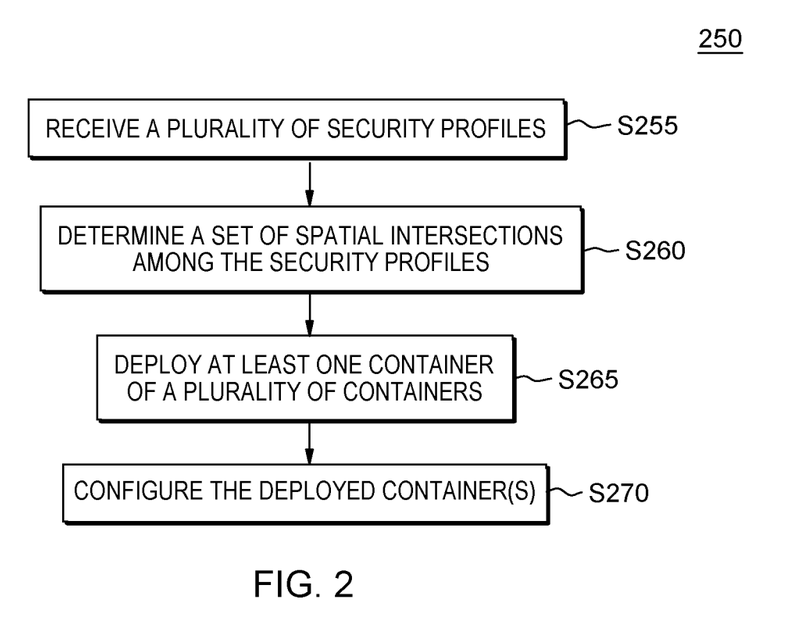
FIG. 2 is a flowchart showing a first embodiment method performed, at least in part, by the first embodiment system.
Figure 3:
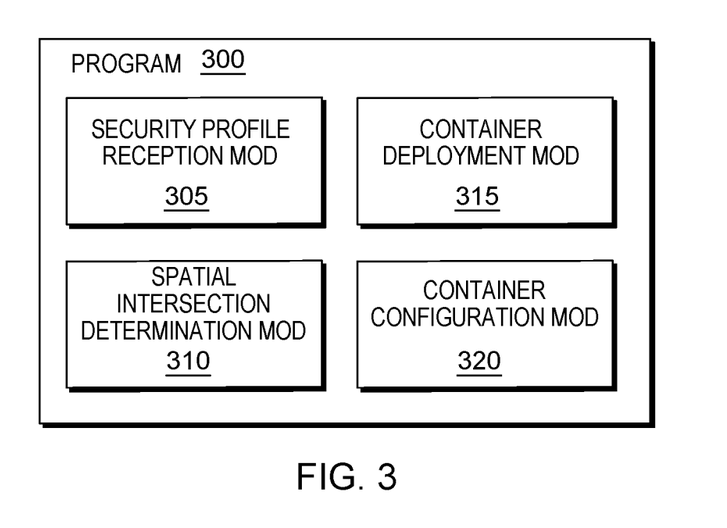
FIG. 3 is a block diagram showing a machine logic (for example, software) portion of the first embodiment system.

FIG. 2 shows flowchart 250 depicting a method according to the present invention. FIG. 3 shows program 300 for performing at least some of the method operations of flowchart 250. This method and associated software will now be discussed, over the course of the following paragraphs, with extensive reference to FIG. 2 (for the method operation blocks) and FIG. 3 (for the software blocks).

Processing begins at operation S255, where security profile reception module ("mod") 305 receives a set of security profiles. In some embodiments, these security profiles include information that indicates security configuration instructions that allows a deployed container to properly run. Additionally, in some embodiments, the security profiles that are received by mod 305 are visually represented as either a two-dimensional (2D) diagram or a three-dimensional (3D) diagram.

Processing proceeds to operation S260, where spatial intersection determination mod 310 determines if and/or where spatial intersections exist amongst the visual representation of the security profiles (discussed in connection with operation S255, above). These spatial intersections amongst the multiple security profiles are used to determine whether a given container can be deployed (discussed further in connection with operation S265, below). One such example of a spatial intersection can be found in block diagram 400 of FIG. 4 (discussed further in Sub-Section III, below).

Processing proceeds to operation S265, where container deployment mod 315 deploys at least one container of a plurality of containers in the identified spatial intersection(s). Processing finally proceeds to operation S270, where container configuration mod 320 configures the deployed container so that the container can run with the appropriate security profile (that is, in the identified spatial intersection amongst the multiple security profiles).

III. Further Comments and/or Embodiments

Some embodiments of the present invention recognize the following facts, potential problems and/or potential areas for improvement with respect to the current state of the art: (i) firewall security profiles define the level of protection on the computer; (ii) each security profile has a predefined set of firewall rules that define the type of traffic that is allowed to or be denied from your computer; (iii) to some levels you can also add rules that you have created yourself; (iv) in any enterprise, there can be different types of security profiles, and security profiles can also be customized for different applications and/or services in any enterprise.

Some embodiments of the present invention recognize the following facts, potential problems and/or potential areas for improvement with respect to the current state of the art: (i) container deployment is a method for quickly building and releasing complex applications; (ii) docker container deployment is a popular technology that gives developers the ability to construct application environments with speed at scale; (iii) container deployment is additionally the action of putting containers to use; (iv) the deployment of containers uses management software that simplifies the launch and updates of applications; (v) container deployment provides fast access to environments and speeds up development because secure containers can be quickly downloaded and put to use; and (vi) container deployment also minimizes errors because it reduces the number of moving parts in development.

Some embodiments of the present invention recognize the following facts, potential problems and/or potential areas for improvement with respect to the current state of the art: (i) applications are deployed with a combination of manual procedures and automated scripts; (ii) security can be a concern when containers run at a root level, which increases vulnerability; (iii) container deployment tools such as Docker and OpenShift/Kubernetes multi-container deployment helps manage these containers in real-world production environments; (iv) these containers replace what used to be a complete reliance on IT engineers; (v) container deployments can replace many of the tasks previously handled by IT operations; (vi) when a tool like Docker deploys multiple containers, it places applications in virtual containers that run on the same operating system; (vii) this provides a benefit not offered by virtual machines; and (viii) using a virtual machine requires running an entire guest operating system to deploy a single application.

Typically, in most enterprises, there can be different security profile for different applications, and on an individual application basis, there can be different types of security profiles. This means that for each and every container, the developer needs to apply different combinations of security profiles individually for the given application. There needs to be a method and system by which developers can quickly create combinations of security profiles and containers can be deployed selectively in different combination of security profiles.

Some embodiments of the present invention may include one, or more, of the following features, characteristics and/or advantages: (i) each and every security profile will be represented by 2D or 3D visual model, using two or more individual security profiles, the developers can create visual model of different intersection area/volume, and each interaction area/volume will be representing resultant security profile, which is combination of one or more security profiles; (ii) based on the required security profile of any container, the developer will be placing the container in the appropriate intersection area/volume of security profiles, and accordingly the container will be configured with appropriate security profile; (iii) after the container is deployed in any intersection area/volume of security profile, the developer can further add or remove one or more security profiles, and accordingly the same security profile will be implemented in the said containers; and (iv) based on the functionality of any container, and required level of security, the proposed system will be recommending in which intersection area/volume of security profile, the container is to be deployed.

Some embodiments of the present invention may include one, or more, of the following features, characteristics and/or advantages: (i) while deploying any container, user can select one or more intersection area/volume, and can create a new security profile from visual representation and deploy the container and the container will be auto configured with that resultant security profile; (ii) when any container is to be deployed in any intersection area/volume of security profile, the proposed system will be simulating the security need of any container, and accordingly based on the successful simulation result, appropriate security will be implemented; (iii) considers the historical performance of an individual security profile and cluster them based on their performance metrics and vulnerability indices (like prone to malware, notwithstanding for new trojan releases) and the impact on infrastructure (like network crash, all data crashed, etc.) and accordingly display or create a visual mapping to the best security Profile for the container for a seamless an defective deployment; (iv) pulls the required security profiles from the security profile library and inject them into the container image when your container placement into a network deployment topology is decided.

Some embodiments of the present invention may include one, or more, of the following features, characteristics and/or advantages: (i) while the container is running, the proposed system also shows visualization of those container and its relative profiles, and, if there are any vulnerabilities affecting the current container security profile; (ii) systems will check if any existing security profile can be deployed which resolves the raised security vulnerability (such as blocking the firewall rule/port); (iii) a given user can drag and drop that security profile over the container to push the change; (iv) alternatively, once the mitigation is developed, the security profile can be added either manually to library or thru 2D/3D visualization model and all container within that placement will automatically receive those updates; (v) provides the ability to visualize the security profiling 2D/3D model and user can manage container profiling by performing operation which are like but not limited to drag, remove, add, create intersection, etc.; and (vi) learns the application context and its relative network architectural specification to come up with required profiling and its relative container placement.

Figure 4:
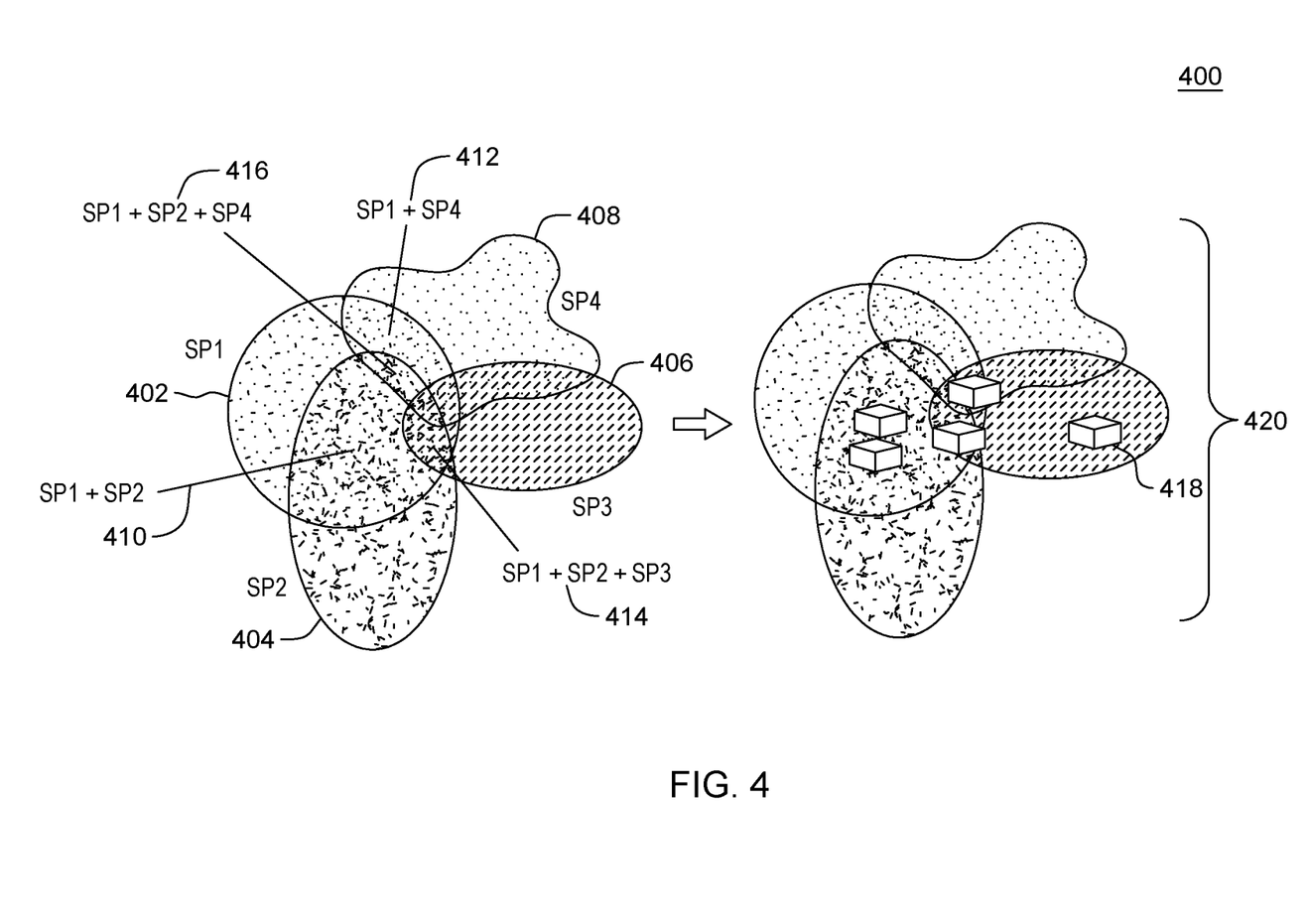
FIG. 4 is a block diagram showing information that is helpful in understanding embodiments of the present invention.

Block diagram 400 of FIG. 4 shows how the intersection diagram is created by the security profiles (SPs), and accordingly the developer can deploy the containers in the intersection diagram. Block diagram shows each security profile and their multiple overlaps (which ultimately correspond to potential security profile locations where a given container can be properly configured and safely run).

Block diagram 400 of FIG. 4 includes the following components: SP1 402, SP2, 404, SP3 406, SP4 408, SP1+SP2 410, SP1+SP4 412, SP1+SP2+SP3 414, SP1+SP2+SP4 416, containers 418 and deployed containers 420.

Some embodiments of the present invention may include one, or more, of the following features, characteristics and/or advantages: (i) in any enterprise, there typically can be multiple security profiles, and each security profile will individually be providing security configuration; (ii) the security profiles will be stored in the security profile library; (iii) the security profile can be modified or updated individually, and when the security profiles are used, then developers have to select the shortcut of the security profile; (iv) at any point of time, security profile can be updated in the security profile library, and accordingly will dynamically update the resultant security profile for each and every container; and (v) each of the security profile will be representing as a 2D or 3D diagram, and the same will be creating an appropriate visual representation.

Some embodiments of the present invention may include one, or more, of the following features, characteristics and/or advantages: (i) represents the security profile as any regular or irregular shape; (ii) the visualization engine will be receiving the security profile and will be creating visualization; (iii) while any container is to be deployed, the developers will be analyzing the security need based on the requirement specification; (iv) the developers can select one or more security profile from the security library, and accordingly will be using the same in the visualization area; and (v) the visualization can be shown in a display device or in a pair of Augmented Reality (AR) glasses, so that the developers can visualize how the resultant security profiles are created.

Some embodiments of the present invention may include one, or more, of the following features, characteristics and/or advantages: (i) in the visualization area, the developers can use one or more security profiles, and if two or more security profiles are selected, then developers can be intersection diagram; (ii) the developer might select 2D or 3D representation of the visualization of security profile and accordingly the intersection diagram will be created; (iii) based on the selection of two or more security profile, the developer can create intersection diagram among the selected security profile; (iv) based on the intersection diagram, the developers can create different combination of security profile and the same will be shown in visualization; (v) the developers can select one or more intersection diagram, and can create a new security profile rule and the same can be used for creating security need in any application; (vi) based on the security need, the proposed system can recommend the appropriate intersection area or developer can also select appropriate intersection area; (vii) the developer can place the containers on any intersection diagram, and based on the selection on intersection diagram, the appropriate security will be applied in the container; (viii) the developers can update the security profile individually in the security profile library, and accordingly each and every intersection area will be updated; (ix) after the container is deployed, the developer can add one or more security profile and alter the intersection area/volume and accordingly new security rule will be updated in the container; and (x) performs historical learning about intersection diagram creation, and accordingly an Artificial Intelligence (AI) module can recommend in which intersection area/volume the container is to be implemented.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

User/subscriber: includes, but is not necessarily limited to, the following: (i) a single individual human; (ii) an artificial intelligence entity with sufficient intelligence to act as a user or subscriber; and/or (iii) a group of related users or subscribers.

Data communication: any sort of data communication scheme now known or to be developed in the future, including wireless communication, wired communication and communication routes that have wireless and wired portions; data communication is not necessarily limited to: (i) direct data communication; (ii) indirect data communication; and/or (iii) data communication where the format, packetization status, medium, encryption status and/or protocol remains constant over the entire course of the data communication.

Receive/provide/send/input/output/report: unless otherwise explicitly specified, these words should not be taken to imply: (i) any particular degree of directness with respect to the relationship between their objects and subjects; and/or (ii) absence of intermediate components, actions and/or things interposed between their objects and subjects.

Without substantial human intervention: a process that occurs automatically (often by operation of machine logic, such as software) with little or no human input; some examples that involve "no substantial human intervention" include: (i) computer is performing complex processing and a human switches the computer to an alternative power supply due to an outage of grid power so that processing continues uninterrupted; (ii) computer is about to perform resource intensive processing, and human confirms that the resource-intensive processing should indeed be undertaken (in this case, the process of confirmation, considered in isolation, is with substantial human intervention, but the resource intensive processing does not include any substantial human intervention, notwithstanding the simple yes-no style confirmation required to be made by a human); and (iii) using machine logic, a computer has made a weighty decision (for example, a decision to ground all airplanes in anticipation of bad weather), but, before implementing the weighty decision the computer must obtain simple yes-no style confirmation from a human source.

Automatically: without any human intervention.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method (CIM) comprising:
   receiving, from a security profile library and to a visualization engine, a plurality of security profiles, with each security profile of the plurality of security profiles being represented as a three-dimensional (3D) visual diagram;
   determining a set of spatial intersections amongst the plurality of security profiles;
   deploying a plurality of containers in the set of spatial intersections, with at least one container of the plurality of containers being deployed in at least one of the spatial intersections; and
   responsive to the deployment of the plurality of containers in the set of spatial intersections, configuring the at least one container being deployed with the security profiles corresponding to the at least one spatial intersection.

2. The CIM of claim 1 wherein the security profiles corresponding to the at least one spatial intersection is a combination of one or more security profiles.

3. The CIM of claim 1 further comprising:
   deploying at least one container of the plurality of containers in a specified spatial intersection.

4. The CIM of claim 3 wherein the specification of the spatial intersection is based, at least in part, upon container functionality.

5. The CIM of claim 1 further comprising:
   determining a first security need of the deployed plurality of containers by running a first security simulation; and
   responsive to the determination of the first security need, implementing a first security measure to remedy the first security need.

6. The CIM of claim 1 wherein the 3D visual diagram of the security profiles provides a visual display of potential security vulnerabilities while the at least one container is operating.

7. A computer program product (CPP) comprising:

a computer readable storage medium; and computer code stored on the computer readable storage medium, with the computer code including instructions and data for causing a processor(s) set to perform operations including the following:

receiving, from a security profile library and to a visualization engine, a plurality of security profiles, with each security profile of the plurality of security profiles being represented as a three-dimensional (3D) visual diagram, determining a set of spatial intersections amongst the plurality of security profiles, deploying a plurality of containers in the set of spatial intersections, with at least one container of the plurality of containers being deployed in at least one of the spatial intersections, and responsive to the deployment of the plurality of containers in the set of spatial intersections, configuring the at least one container being deployed with the security profiles corresponding to the at least one spatial intersection.

8. The CPP of claim 7 wherein the security profiles corresponding to the at least one spatial intersection is a combination of one or more security profiles.

9. The CPP of claim 7 further comprising:

deploying at least one container of the plurality of containers in a specified spatial intersection.

10. The CPP of claim 9 wherein the specification of the spatial intersection is based, at least in part, upon container functionality.

11. The CPP of claim 7 further comprising:

determining a first security need of the deployed plurality of containers by running a first security simulation; and responsive to the determination of the first security need, implementing a first security measure to remedy the first security need.

12. The CPP of claim 7 wherein the 3D visual diagram of the security profiles provides a visual display of potential security vulnerabilities while the at least one container is operating.

13. A computer system (CS) comprising:

a processor(s) set;

a computer readable storage device; and computer code stored on the computer readable storage device, with the computer code including instructions and data for causing the processor(s) set to perform operations including the following:

receiving, from a security profile library and to a visualization engine, a plurality of security profiles, with each security profile of the plurality of security profiles being represented as a three-dimensional (3D) visual diagram, determining a set of spatial intersections amongst the plurality of security profiles, deploying a plurality of containers in the set of spatial intersections, with at least one container of the plurality of containers being deployed in at least one of the spatial intersections, and responsive to the deployment of the plurality of containers in the set of spatial intersections, configuring the at least one container being deployed with the security profiles corresponding to the at least one spatial intersection.

14. The CS of claim 13 wherein the security profiles corresponding to the at least one spatial intersection is a combination of one or more security profiles.

15. The CS of claim 13 further comprising:

deploying at least one container of the plurality of containers in a specified spatial intersection.

16. The CS of claim 15 wherein the specification of the spatial intersection is based, at least in part, upon container functionality.

17. The CS of claim 13 further comprising:

determining a first security need of the deployed plurality of containers by running a first security simulation; and responsive to the determination of the first security need, implementing a first security measure to remedy the first security need.

18. The CS of claim 13 wherein the 3D visual diagram of the security profiles provides a visual display of potential security vulnerabilities while the at least one container is operating.

\* \* \* \* \*